UNITED STATES PATENT OFFICE.

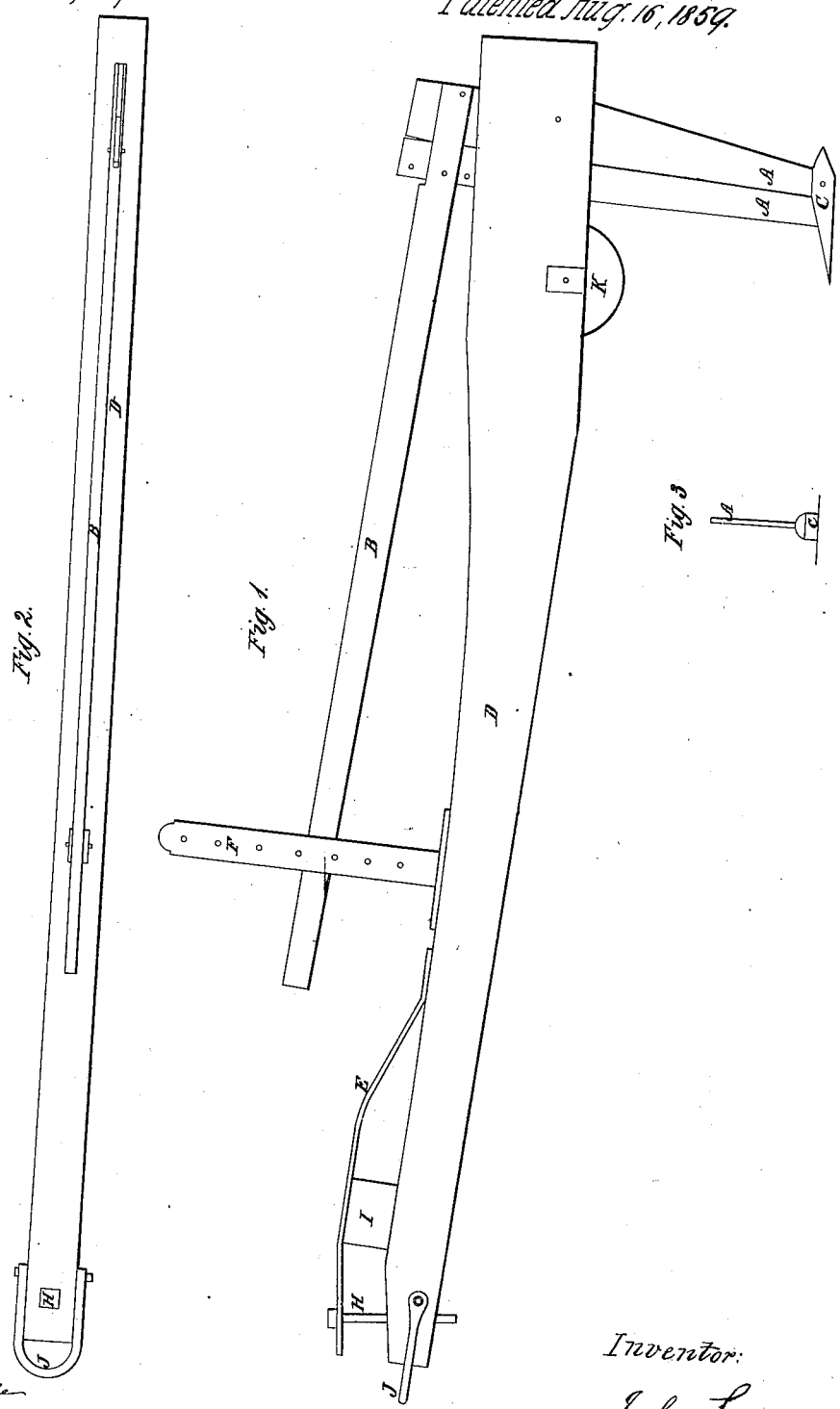

JOEL LEE, OF GALESBURG, ILLINOIS.

IMPROVEMENT IN MOLE-PLOWS.

Specification forming part of Letters Patent No. 25,127, dated August 16, 1859.

*To all whom it may concern:*

Be it known that I, JOEL LEE, of Galesburg, in the county of Knox, State of Illinois, have invented a new and useful Machine for Underground Draining; and I do hereby declare that the following is a full, clear, and exact description of the construction and operation of the same, reference being had to the annexed drawings, making a part of this specification, in which—

Figure 1 is a side view, Fig. 2 is a top view, Fig. 3 is a back view, of mole.

The nature of my invention consists—

First, in providing the machine with two swords standing perpendicular, or nearly so, the front sword being sharp for the purpose of cutting the earth, with the lower end pivoted to the mole the nearest to the front point for the purpose of raising or depressing the mole, the rear sword for the purpose of assisting to support the pressure, and being bolted firm to the beam near the top of the sword, and the lower end pivoted near the rear point of mole to act as a fulcrum to change the position of mole.

Second, in providing a lever, in combination with the swords, for the purpose of adjusting the mole at any required position.

Third, in forming the mole flat on the bottom forward of the heel of the rear sword, holding its full width to near the point in front and the rear part of the bottom sloped back and up, forming the rear point at the top of the mole, the top of mole slightly ovaling and rising very gradually from the front point of the mole, until arriving nearly opposite the point in the heel of the rear sword, then depressed slightly, so as not to hit the dirt at the rear end of mole. This flat oval shape is for the purpose of pressing the dirt mostly in the top, it being understood that the roof or arch is the most likely to fall in; hence the necessity to press the top the hardest. The bottom of the mole being flat and broad when raised in front will carry the whole machine above ground, and when depressed will readily enter the ground. The rear end of the mole is sloped back and up for the purpose of raising the machine out of the ground. In case of getting under a root or stone, hitch the team to the hind end of the machine and pull it back. It will raise entirely out of the earth, if required.

To enable others skilled in the art to make and use my invention, I will proceed to describe its construction and operation.

A A represent the swords; B, the lever; C, the mole; D, the beam; E, the upper section of beam; F, the standard to secure the lever; H, the king-bolt to secure the beam to the forward axle-tree of a common wagon; I, the block to be removed until the slider of the wagon is between the two sections of beam and then replaced; J, the clevis to hitch the team to, except the one on the tongue; K, a revolving colter immediately in front of the swords.

Thus it will be seen that I furnish a machine easily managed by raising the lever, and consequently the front sword and front point of mole. The machine will rise in proportion as the lever is operated, or in case we wish to turn round it may be run entirely out of the ground and turn without straining the colter or swords. Depress the lever and the machine will descend into the ground until the bottom of the mole is horizontal or the beam hits the earth, the axle of the wagon keeping the machine in a proper position.

What I claim as my invention, and desire to secure by Letters Patent, is—

1. The two swords fitting closely together, the front one attached to the mole near the forward point, the rear sword pivoted near the rear point of mole.

2. The lever, in combination with the swords, for operating or adjusting the front sword and the mole.

JOEL LEE.

Witnesses:
   A. C. DAMAKER,
   JOHN MCFARLAND.